L. HOLLAND-LETZ.
SWITCH CONTROLLING MECHANISM FOR SELF RAKE REAPERS.
APPLICATION FILED MAY 24, 1913.

1,207,405.

Patented Dec. 5, 1916.
5 SHEETS—SHEET 2.

Witnesses:
C. C. Palmer
E. O. Burgess

Inventor:
Lud Holland-Letz,
By Chas. E. Lord
Atty.

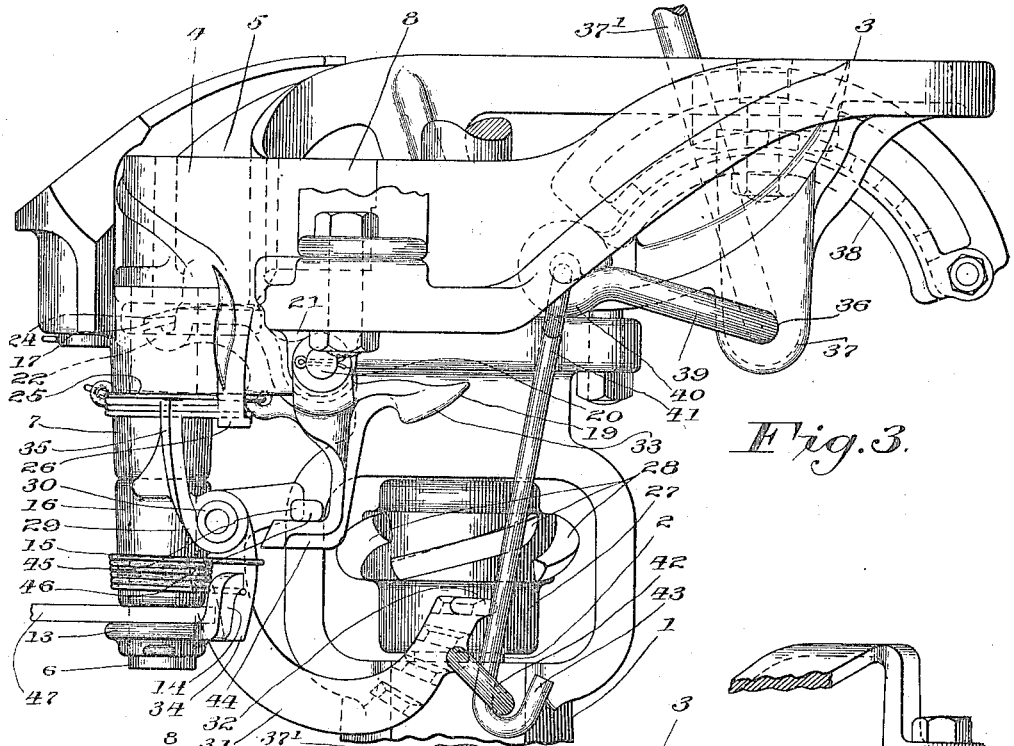
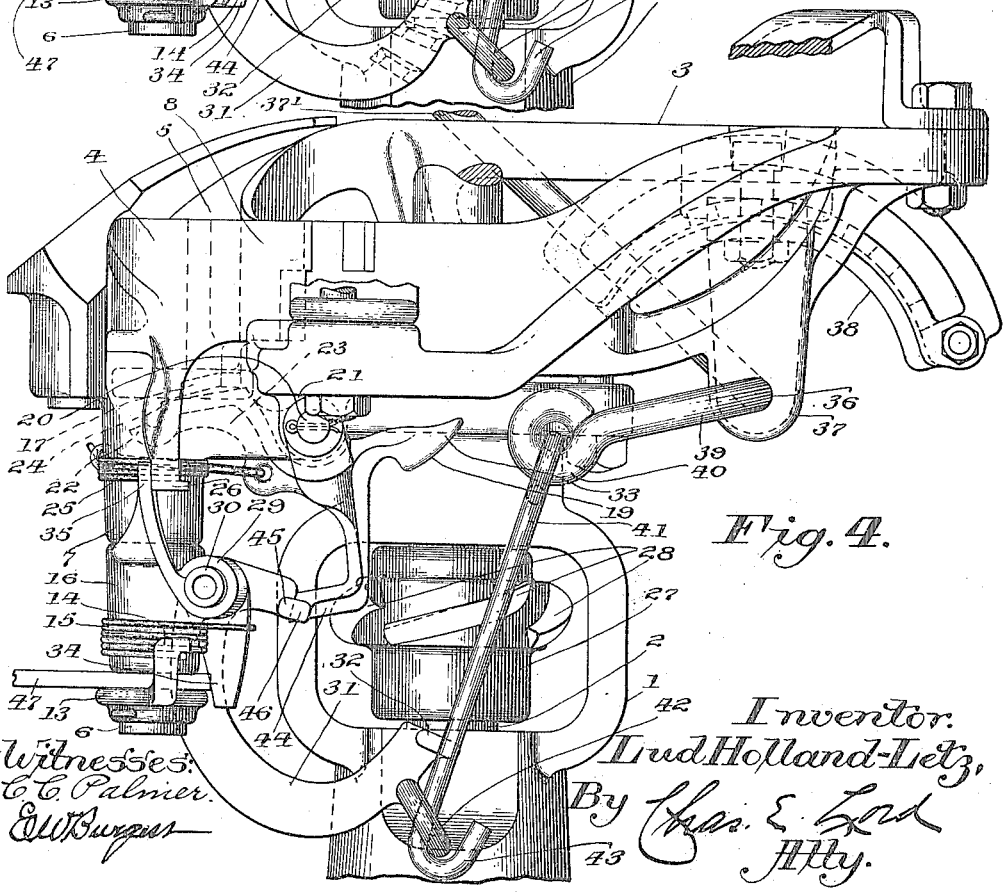

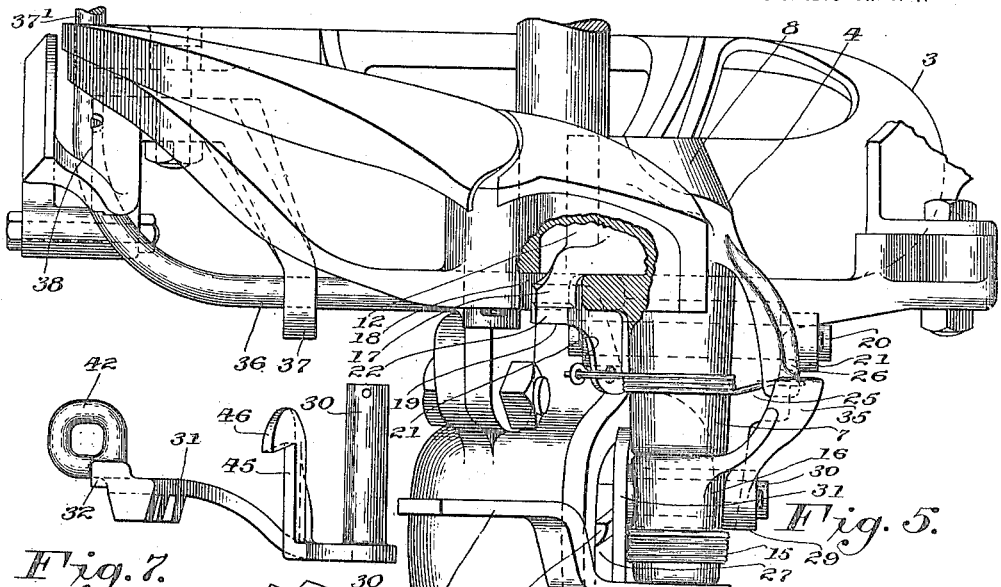
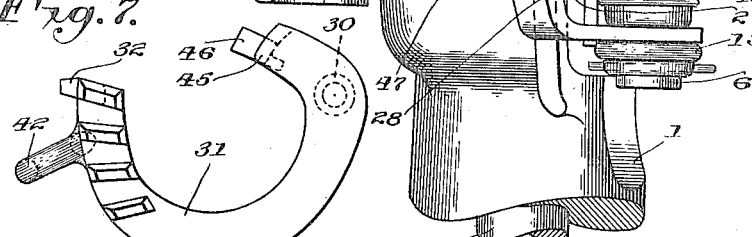
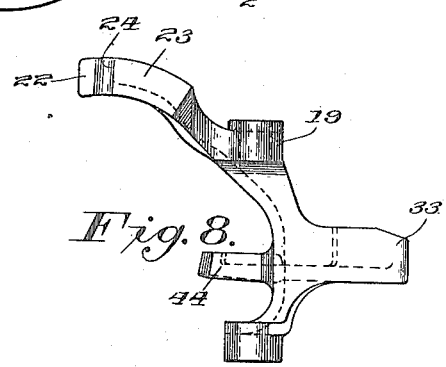
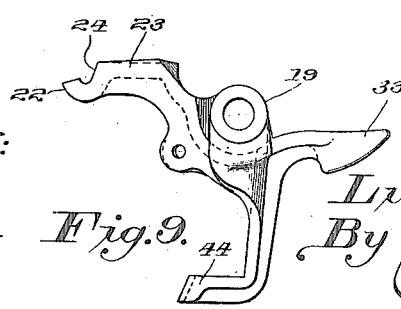

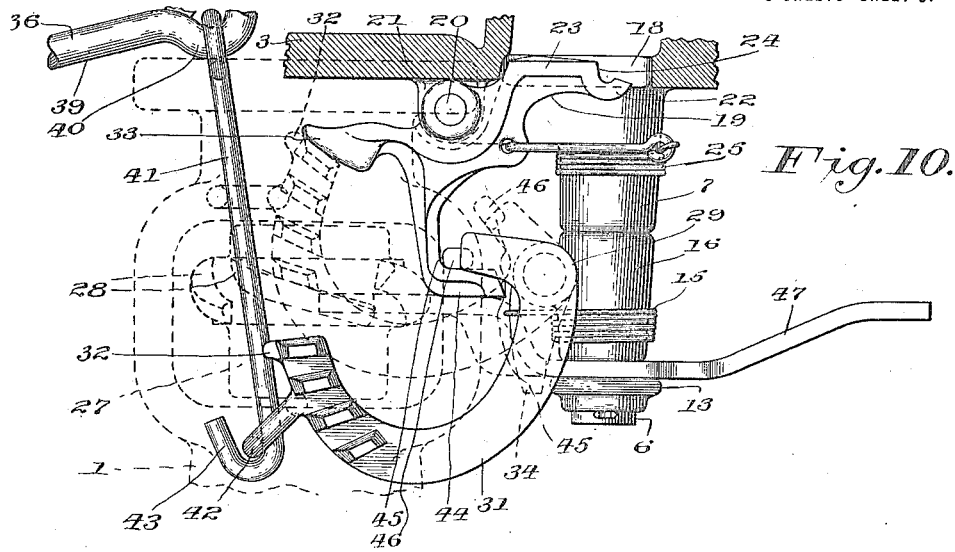
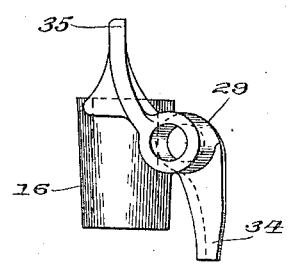

UNITED STATES PATENT OFFICE.

LUD HOLLAND-LETZ, OF CHICAGO, ILLINOIS, ASSIGNOR TO INTERNATIONAL HARVESTER COMPANY OF NEW JERSEY, A CORPORATION OF NEW JERSEY.

SWITCH-CONTROLLING MECHANISM FOR SELF-RAKE REAPERS.

1,207,405.

Specification of Letters Patent.

Patented Dec. 5, 1916.

Application filed May 24, 1913. Serial No. 769,710.

*To all whom it may concern:*

Be it known that I, LUD HOLLAND-LETZ, a citizen of the United States, residing at Chicago, in the county of Cook and State of Illinois, have invented certain new and useful Improvements in Switch-Controlling Mechanism for Self-Rake Reapers, of which the following is a full, clear, and exact specification.

My invention relates to switch controlling means whereby the switch will be automatically released at predetermined intervals for the purpose of permitting the rake mechanism to sweep the grain platform and deliver the accumulated grain therefrom, combined with means whereby the operation of the automatically operating mechanism may be temporarily suspended when it is desired that the grain be permitted to accumulate upon the grain platform, as when the machine is being turned at the corners of the field, and whereby the opening of the rake switch will be at all times under the control of the operator regardless of the adjustment of the automatically operating mechanism; the object of the invention being to provide a mechanism that will be positive and efficient in operation and not subject to disarrangement from wear upon the parts thereof. I attain these objects by means of mechanism, one embodiment of which is illustrated in the accompanying drawings, in which—

Figure 1:
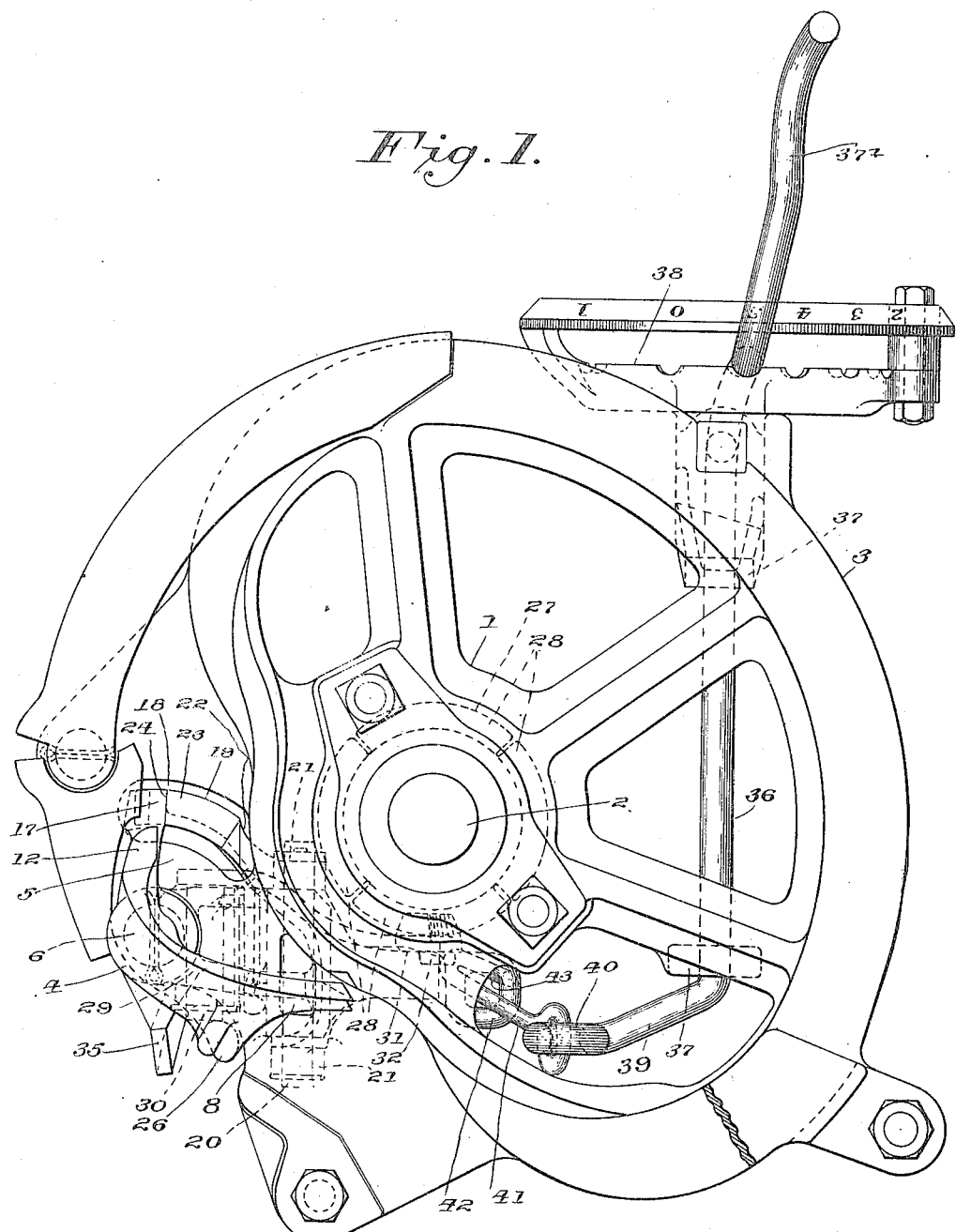
Figure 2:
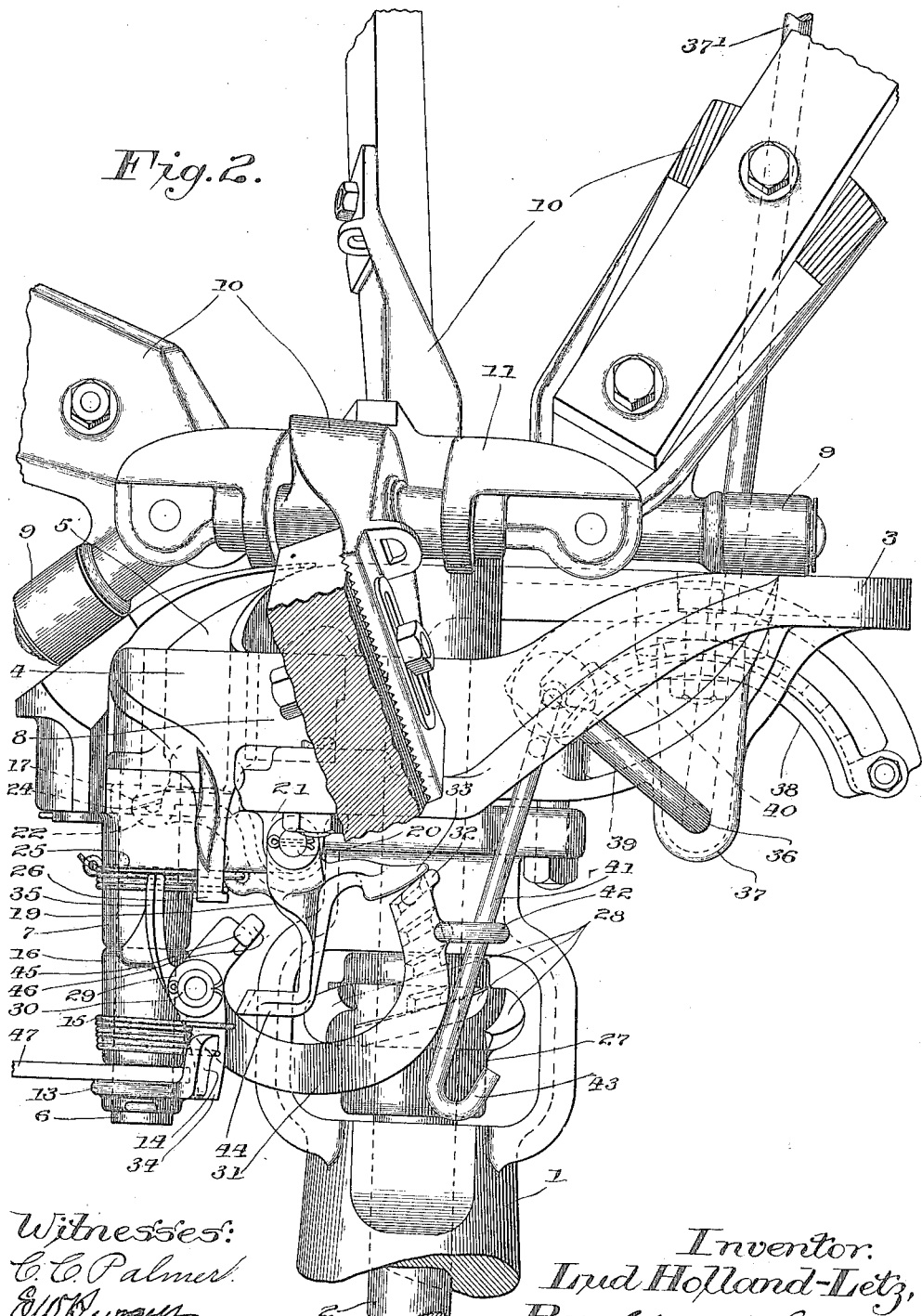

Figure 1 represents a top plan view of part of a self-rake mechanism having my invention embodied in its construction; Fig. 2 is a side elevation of Fig. 1 showing the rake head and part of the rakes attached thereto, and illustrating the operation of my invention; Fig. 3 is a side elevation of part of Fig. 1 showing the switch controlling mechanism in one position of adjustment; Fig. 4 is a view similar to Fig. 3 and showing the switch controlling mechanism in a different position of adjustment; Fig. 5 is a side elevation of Fig. 1 as viewed from left to right of the sheet; Fig. 6 is a vertical elevation of a toothed switch controlling member forming a detail part of the mechanism; Fig. 7 is a top plan view of Fig. 6; Fig. 8 is a top plan view of a switch latch member; Fig. 9 is a vertical side elevation of Fig. 8; Fig. 10 is a sectional detail of parts of the switch controlling mechanism designed to illustrate the operation of the associated parts of the same; Fig. 11 is a vertical side elevation of a barrel member forming part of the controlling mechanism; Fig. 12 is a side elevation of Fig. 11; and Fig. 13 is a side elevation of Fig. 12.

The same reference numerals designate like parts throughout the several views.

1 represents a part of a rake stand, 2 a vertically arranged rake driving shaft journaled therein, 3 a rake controlling cam mounted upon the stand, the cam having a common form of switch 4 adapted to open or close the passageway 5, separating one portion of the cam from another in a manner whereby the rakes are either raised to pass over the grain accumulated upon the platform of a reaper, or permitted to sweep across the platform in a manner to deliver the grain therefrom. The switch 4 is provided with a vertically arranged spindle portion 6 that is journaled in a depending sleeve 7 integral with the cam 3. A head portion 8 is adapted to swing laterally in a manner to open or close the passageway 5 for the entrance of rollers 9 journaled upon the rake carrying arms 10 that are pivotally connected with a head member 11 secured to the upper end of the rake driving shaft 2. The rake switch 4 is also provided with a heel portion 12 that projects into the passageway 5 within the path of the rollers 9 when the switch is in open position.

13 represents a collar member secured to the lower end of the spindle 6 and provided with a vertically arranged ear portion 14 that receives one end of a coiled spring 15, the opposite end of the spring being connected to a sleeve member 16 carried by the spindle 6 and permitted to have a limited rocking movement thereon for purposes to be described later, the spring being operative to normally open the switch and permit a free passage of the rollers 9 carried by the rake arms 10 through the passageway 5 between the two portions of the rake controlling cam. The heel member 12 of the switch 4 terminates in a depending locking member 17 that is received by a segmental slot 18 arranged concentric with the axis of the switch.

19 represents a switch latch member mounted upon a pin 20 that is received by lateral openings in depending ear members 21 integral with the cam member 3; the latch member being provided with a laterally extending arm member 22 having a curved portion 23 that is received by the segmental slot 18 in the cam, the curved portion of the latch member terminating in a shoulder portion 24 that engages with the locking member 17 of the switch when said switch is in a closed position, as shown in Figs. 1 and 2. The latch securing the switch in its closed position is actuated in a direction to engage the switch by means of a spring 25 coiled about the sleeve 7 and having one end connected with the latch below the axis thereof, and the opposite end of the spring connected with a depending finger 26 integral with the switch 4.

27 represents a sleeve member secured to the rake driving shaft 2 and provided with a series of face cams 28 arranged as parts of quadruple threads of a worm, each cam extending through 90° of the periphery of the sleeve and corresponding in number with the number of rakes carried by the rake head. The sleeve member 16 is provided with a transversely arranged barrel member 29 that receives a stem 30 integral with a toothed latch tripping member 31 adapted to engage with the cams 28 and provided with a contact portion 32 that engages with an arm 33 integral with the switch latch member 19 in a manner to rock the latch about the axis thereof when the toothed sector has reached a predetermined limit of its rocking movement in one direction. The toothed sector 31 is provided with four teeth corresponding with the number of rakes and the number of cams 28 in the worm, and is normally turned in a direction to engage with the cams 28 by means of the spring 15 engaging with a vertically arranged arm 34 integral with the sleeve 16, and 35 represents a supplemental arm integral with the sleeve 16 upon the opposite side thereof and extending upward within the path of movement of the depending finger 26 forming part of the rake switch 4.

36 represents a rock shaft journaled in depending ear members 37 integral with the cam 3 having an upwardly extending lever arm 37¹ at one end thereof that extends within convenient reach of the operator and is adapted to engage with a notched index sector 38 in a manner to secure the shaft in various positions of adjustment, the opposite end of the shaft being provided with a laterally extending arm 39 provided with an eye member 40 whereby the arm is connected with the upper end of a link member 41, the lower end of the link being slidably connected with the toothed latch tripping sector 31 by means of an eye member 42 integral with the said sector and provided with a large open hook 43 at the lower end thereof. When the toothed latch tripping sector is rocked upward about the axis thereof into engagement with the switch latch, it will slide freely along the link member 41 until it causes the switch latch to release the switch 4, and the switch will be immediately thrown open by the force of the spring 15, and as the switch approaches the limit of the angular movement thereof to an open position, the finger 26 engages with the arm 35 in a manner to rock the sleeve 16 about the axis of the spindle 6 and thereby cause the toothed latch tripping sector 31 to swing out of engagement with the actuating cams 28, and it immediately falls to its initial position as controlled by the open hook 43 at the lower end of the link 41. The limit of the upward movement of the latch tripping sector is fixed at a point that will cause the switch latch to be fully released from the switch and its downward swing is limited by the position of the hook 43, and the position of the hook is controlled by the position of adjustment of the arm 37¹ relative to the index sector 38. When the lever is in the position shown in Fig. 2 and engaging with the notch having the number 5, each fifth rake will sweep the platform, for the reason that the sector 31 will not drop below a position that will permit one of the cams 28 to engage with the highest tooth thereon, and as the cams successively engage with the teeth the sector is raised until it causes a disengagement of the switch latch 19, permitting the succeeding rake to enter the passageway 5; the series of cams and teeth being properly arranged and the movement thereof so timed as to move in unison with the rakes and prevent any premature opening of the switch that might cause an injury to the operative parts of the mechanism. When the lever is in the position to be engaged by the notch numbered 4, the cams will only engage with three of the teeth and each fourth rake will sweep the platform; if in number 3, with two teeth, and each third rake will sweep the platform; and if in number 2, with one tooth, and each second rake will sweep the platform. When the hand adjusting lever is placed at the position designated by the index numeral 0, none of the rakes will sweep the platform for the reason that the latch tripping sector has dropped to a position where none of the teeth upon the sector will engage with the cams 28, and consequently the switch remains locked in a closed position. When the lever is in the position indicated by numeral 1 and the switch latch has been disengaged from the switch, a depending arm 44 integral with the latch engages with a laterally projecting finger 45 integral with the latch tripping secton 31, as shown in Fig. 4, in a manner to hold the switch latch against a rocking movement in a direction to hold the switch closed, and consequently it opens as soon as the roller upon the rake arm has passed the heel thereof, and each rake will sweep the grain platform. When the mechanism is adjusted to a position whereby each rake will sweep the grain platform, the constant opening and closing of the rake switch, and consequent rocking movement of the sleeve member 16 carrying the toothed latch tripping sector 31, will vibrate the sector more or less as each rake passes the switch, and to prevent any possibility of disarrangement of the parts and rattling thereof, the finger 45 is provided at the free end thereof with a lip member 46 that engages with the depending arm 44 in a manner to limit an outward swinging movement of the toothed latch tripping sector.

47 represents an arm loosely mounted upon the lower end of the spindle 6 and adapted to be connected with a foot lever mounted upon the machine within convenient reach of the operator. The arm 47 is adapted to engage with the toothed latch tripping sector 31 when swung in one direction in a manner to swing the sector about the axis thereof to a limited extent and to a position permitting one of the faced cams 28 to engage with the lower teeth upon the sector. When it is desired to suspend the operation of the automatic controlling mechanism, either to permit a rake to sweep the platform or to prevent any of the rakes from delivering a gavel, the arm 47 engages with a fixed part of the mechanism in a manner to limit a swinging movement thereof in a direction to actuate the toothed latch tripping sector, and when the arm 47 has reached the limit of its swinging movement, it engages with the depending arm 34 in a manner preventing a rocking movement of the sleeve 16 in a direction to permit the toothed latch tripping sector to engage with the cams 28 until the operator releases the arm 47. When the mechanism is adjusted as shown in Figs. 3 and 10, none of the rakes will sweep the platform, and if the operator desires to suspend such action, he will throw the arm 47 in a direction to lift the toothed latch tripping sector to the position shown by dotted lines in Fig. 10, and when the arm is released the toothed latch tripping sector will immediately swing into engagement with one of the cams 28 and cause the disengagement of the switch latch, and the switch will open and allow a rake to pass, and in doing so will rock the sleeve 16 and swing the sector outward and it will fall to its initial position. If the mechanism is in the position of adjustment shown in Fig. 4, with the switch latch locked in position, each rake will sweep the platform, and if the operator desires that the switch be closed temporarily, he will manipulate the arm 47 in a direction to raise the toothed latch tripping sector to the position shown by dotted lines in Fig. 10, and when the switch closes the latch will be moved in contact therewith and it will be held closed until the operator releases the arm 47, for the reason that the depending arm 34 is engaged by the arm 47 and the sleeve 16 is held turned in a direction preventing the engagement of the toothed sector with the cams 28, and in the same manner the operator is able to control the mechanism through the arm 47 so as to temporarily suspend the automatic action thereof regardless of the position of the arm 37' relative to the index sector 38.

While I have in this application specifically described one embodiment which my invention may assume in practice, it is to be understood that this form thereof is used for purposes of illustration and that the invention is not limited thereto and may assume other and modified forms without departing from its spirit.

What I claim as my invention and desire to secure by Letters Patent is:

1. In a reaper switch, a cam track, a pivoted switch forming a part thereof and having a heel portion engageable by a roller passing through the switch, the heel portion of the switch terminating in a locking member, and a switch latch for engaging said locking member.

2. In a reaper switch, a cam track, a pivoted switch forming a part thereof and having a heel portion engageable by a roller passing through the switch, and a switch latch engaging the heel portion of said switch.

3. In a reaper switch, a cam track, a pivoted switch forming a part thereof and having a heel engageable by a roller passing through the switch and terminating in a depending portion, and a switch latch engageable with the depending portion of said heel.

4. In a reaper switch, a cam track, a pivoted switch forming a part thereof and having a depending spindle, a switch latch pivoted on said cam engaging said switch at a point at one side of its pivot, and means carried on said spindle for controlling said latch.

5. In a reaper switch, a cam track, a pivoted switch forming a part thereof and having a heel terminating in a depending portion, and a coöperating switch latch member mounted beneath said cam having a shoulder portion engageable with the depending portion of the switch when the latter is in closed position.

6. In a reaper switch, a cam track, a pivoted switch forming a part thereof and having a heel provided with a depending portion, a latch member mounted beneath said cam having a portion engageable with the depending portion of the switch when the latter is in closed position, and means normally holding said latch in switch engaging position.

7. In a reaper switch, a cam track, a pivoted switch forming a part thereof and having a depending spindle, said switch having a heel provided with a depending portion, a latch member mounted beneath said cam and having a portion engageable with the depending portion of the switch when the latter is in closed position, and a spring carried on said switch spindle and connected to said switch and latch.

8. In a reaper switch, a cam track, a switch pivoted thereon, said track having a slot therein concentric with the pivot of said switch and said switch having a depending portion on its heel movable in said slot, and a switch latch journaled beneath said cam having an arm movable in said slot and engageable with the depending portion of said switch.

9. In a reaper switch, a cam track, a switch forming a part thereof, a latch member controlling said switch, rake driving mechanism including a plurality of rotating cams, a latch tripping sector engageable successively with said cams, and a link coupled and slidably connected to said sector and adjustable to vary the range of movement thereof.

10. In a reaper switch, a cam track, a switch forming a part thereof, a switch latch, rake mechanism including a plurality of rotating cams, a latch releasing sector engageable with said cams, and means coupled and slidably connected to said sector and journaled beneath said rake mechanism angularly adjustable to vary the range of movement of said sector.

11. A switch controlling mechanism for self-rake reapers including, in combination, a rake controlling cam, a pivoted switch forming part of said cam and having a depending spindle, a spring controlled switch latch, and means mounted upon said spindle and operative to release said latch.

12. A switch controlling mechanism for self-rake reapers including, in combination, a rake controlling cam, a pivoted switch forming part of said cam and having a depending spindle, a switch latch, means mounted upon said spindle and operative to release said latch, and a spring carried by said spindle and operative normally to open said switch and to hold the latch releasing means in an operative position.

13. A switch controlling mechanism for self-rake reapers including, in combination, a rake controlling cam, a pivoted switch forming part of said cam and provided with a depending spindle, a pivoted switch latch, means mounted upon said spindle and operative to release said latch, and means carried by said spindle and adapted to engage with said switch latch in a manner to render said latch inoperative.

14. A switch controlling mechanism for self-rake reapers including, in combination, a rake controlling cam, a pivoted switch forming part of said cam and provided with a depending spindle portion, a pivoted switch latch, a swinging latch releasing member mounted upon said spindle, and an arm forming part of said member, said arm adapted to engage with said switch latch and lock it in an inoperative position.

15. A switch controlling mechanism for self-rake reapers including, in combination, a rake controlling cam, a pivoted switch forming part of said cam and provided with a depending spindle, a switch latch, a swinging automatically operated latch tripping lever mounted to turn about the axis of said spindle, and a foot controlled arm loosely mounted upon said spindle and adapted to engage with said latch tripping lever and swing it into an operative position.

16. A switch controlling mechanism for self-rake reapers including, in combination, a rake controlling cam, a switch forming part of said cam and provided with a depending spindle, a switch latch, a switch latch releasing member mounted upon said spindle and operative positively to release said latch, and an arm under the control of the operator for raising said releasing member to an operative position.

17. A switch controlling mechanism for self-rake reapers including, in combination, a rake controlling cam, a pivoted switch forming part of said cam and provided with a depending spindle, a switch latch pivoted upon a fixed part of the mechanism and operative to lock said switch in a closed position, a worm, a sleeve journaled upon said spindle, a swinging toothed latch releasing sector pivotally mounted upon said sleeve engageable with said worm to release said switch latch, means including an adjustable member controlling a swinging movement of said sector in one direction whereby it may be given various initial positions, said sleeve having a vertically arranged arm engageable with said switch in a manner to turn said sleeve about the axis thereof when said switch is moved to an open position, and spring mechanism for yieldingly moving said switch to an open position and said toothed sector out of engagement with said worm.

18. A switch controlling mechanism for self-rake reapers including, in combination, a rake stand, a vertically arranged rake driving shaft journaled in said stand, a rake carrying head secured to said shaft, a rake controlling cam secured to said stand, a pivoted rake switch forming part of said cam, a spring normally operative to swing said switch to an open position, a switch latch operative to hold said switch in a closed position, means for controlling the movement of said latch, said means including a series of cams rotatable with said rake driving shaft and arranged as parts of quadrilateral threads of a worm, a pivoted toothed latch tripping sector adapted to engage with said cams, a rock shaft journaled in bearings carried by said stand and said rake, having a hand lever at one end thereof, and a laterally projecting arm at its opposite end, and a link connection between said arm and said latch tripping sector.

19. A switch controlling mechanism for self-rake reapers including, in combination, a rake stand, a vertically arranged rake driving shaft journaled in said stand, a rake carrying head secured to said shaft, a rake controlling cam secured to said stand, a pivoted rake switch forming part of said cam, a spring normally operative to swing said switch to an open position, a switch latch operative to hold said switch in a closed position, means for controlling the movement of said latch, said means including a swinging toothed latch tripping sector, a rock shaft journaled in bearings carried by said stand, said shaft having a hand lever at one end thereof and a projecting arm at its opposite end, and a sliding link connection between said arm and said latch tripping sector.

20. A switch controlling mechanism for self-rake reapers including, in combination, a rake stand, a vertically arranged rake driving shaft journaled in said stand, a rake carrying head secured to said shaft, a rake controlling cam secured to said stand, a pivoted rake switch forming part of said cam, a spring normally operative to swing said switch to an open position, a switch latch operative to hold said switch in a closed position, means for controlling the movement of said latch, said means including a swinging toothed latch tripping sector, a rock shaft journaled in bearings carried by said stand, said shaft having a hand lever at one end thereof and a projecting arm at its opposite end, and a link having one end thereof flexibly connected with said arm and a hook at its opposite end, the body portion of said link being slidably connected with said sector.

In testimony whereof I affix my signature, in the presence of two witnesses.

LUD HOLLAND-LETZ.

Witnesses:
JOHN P. SMITH,
VINCENT D. LAWLER.